United States Patent
Furhrer et al.

(10) Patent No.: US 7,200,766 B2
(45) Date of Patent: Apr. 3, 2007

(54) METHOD AND SYSTEM FOR THE DISTRIBUTED SYNCHRONIZATION OF USERS OF A COMMUNICATIONS LINK

(75) Inventors: Thomas Furhrer, Gerlingen (DE); Bernd Müller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 10/021,460

(22) Filed: Oct. 29, 2001

(65) Prior Publication Data

US 2002/0095612 A1 Jul. 18, 2002

(30) Foreign Application Priority Data

Oct. 27, 2000 (DE) ............... 100 53 525

(51) Int. Cl.
*G06F 1/12* (2006.01)
(52) U.S. Cl. .................... 713/400; 713/375
(58) Field of Classification Search ............ 713/600, 713/375, 400
See application file for complete search history.

(56) References Cited

U.S. PATENT DOCUMENTS

| | | | | |
|---|---|---|---|---|
| 5,041,966 A | * | 8/1991 | Nakai et al. ............ | 709/400 |
| 5,384,906 A | * | 1/1995 | Horst ..................... | 709/400 |
| 5,402,394 A | * | 3/1995 | Turski .................... | 368/10 |
| 5,875,320 A | * | 2/1999 | Gu ......................... | 709/400 |
| 5,896,524 A | * | 4/1999 | Halstead et al. ......... | 709/400 |
| 5,958,060 A | * | 9/1999 | Premerlani ............. | 713/400 |
| 6,654,356 B1 | * | 11/2003 | Eidson et al. ........... | 370/303 |
| 2003/0188221 A1 | * | 10/2003 | Rasmussen et al. .... | 714/11 |

* cited by examiner

*Primary Examiner*—Lynne H. Browne
*Assistant Examiner*—Tse Chen
(74) *Attorney, Agent, or Firm*—Kenyon & Kenyon LLP

(57) ABSTRACT

A method and a system for synchronizing at least two users are described, each user to be synchronized containing its own timer, and the users being connected by at least one communications link, at least one event being transmitted for synchronization on the communications link, a first user determining a first view of the global time as a function of the event, and the at least one second user determining a second view of the global time as a function of the event, the minimum of the first and second views of the global time being transmitted through the corresponding users on the communications link, and each user to be synchronized determining an overall global time from the minimum of a first global time view and a second global time view, and the timer contained therein being synchronized with the overall global time.

17 Claims, 4 Drawing Sheets

METHOD AND SYSTEM FOR THE DISTRIBUTED SYNCHRONIZATION OF USERS OF A COMMUNICATIONS LINK

FIELD OF THE INVENTION

The present invention relates to a method and a system for synchronizing at least two users, each user to be synchronized having its own timer, and the users being connected over at least one communications link.

BACKGROUND OF THE INVENTION

For several years, the CAN protocol has been used as the conventional art in automotive networking, where communications are event controlled. Very large loads can be generated if the transmission of several different messages is to be initiated at the same time. The nondestructive arbitration mechanism of CAN guarantees sequential transmission of all messages according to the priority of their identifiers. For strict realtime systems, there must first be an analysis of the running times and bus loads for the entire system to ensure that all message deadlines can be met (even at peak loads).

If such a system is to be operated as a time-controlled system, as described in unpublished German Patent Application No. 100 00 303.6, for example, a first user will control the timing of the messages in a function as a timer so that it repeatedly transmits over the bus at preselectable intervals a reference message containing time information regarding the time base of the first user, an at least second user forming via its time base its own time information as a function of the time information of the first user, a correction value being determined from the two items of time information, and the second user adjusting its time information and/or its time base as a function of the correction value.

Other synchronization mechanisms are also used in addition to such a master synchronization.

There are thus conventional communications protocols based on time-controlled processing such as TTP/C or Interbus-S. The special feature here is that bus access is scheduled in advance by assigning transmission times. In the case of such an implicit synchronization, a schedule of transmission times to which users are bound is thus predetermined. Thus, in the TTP/C protocol, time information is distributed to individual users by allocation of communications objects to global time according to schedule and appropriate adjustment of local time.

Therefore, collisions are avoided during run time. However, this also avoids a peak load on the communications bus. Thus, the bus is frequently not fully utilized.

These conventional methods are not capable of yielding optimum results in all regards.

SUMMARY

The present invention relates to a method of synchronizing clocks or internal timers which is very robust with respect to many different error mechanisms and nevertheless permits a high synchronization quality.

In accordance with an example embodiment of the present invention, a method and a system for synchronizing at least two users is provided, each user to be synchronized having its own individual timer, the users being connected by at least one communications link, with at least one event being transmitted on the communications link for synchronization.

According to one embodiment of the present invention, a first user determines a first view of the global time as a function of the event, and at least one second user determines a second view of the global time as a function of the event. The first and second view of the global time thus determined are then transferred by the corresponding users over the communications link. Each user determines an overall global time from the at least first and second views of the global time synchronizing its individual timer with the overall global time.

No implicit information regarding the communications schedule is needed, because the global time is thus apparent explicitly and precisely on the bus or the communications link.

In addition, the at least one event may be transmitted repeatedly over the communications link, so that such a synchronization method can also be used in systems that are not time controlled.

Interfaces for an external clock synchronization may also be automatically included in another embodiment of the present invention.

Each user to be synchronized may determine the overall global time in the same manner.

In addition to the method, i.e., algorithm according to the present invention, the data security mechanism on the bus, i.e., extreme fail-safe and error-tolerant measures, are also possible as protection against errors.

In comparison with conventional implicit methods, controller costs may be significantly lower because the need for complicated schedule generation and monitoring is eliminated. A possible reduction in available bandwidth of the communications link in comparison with the implicit system in the case of modern media may turn out to be so low that it does not result in any degradation of function.

In addition, the shape of the first and/or at least one second local global time curve between two events and the shape of the overall global time curve in the first and/or at least one second user may also be approximated to one another, and in particular they may be fitted to one another.

The effects of aging and temperature and other such causes of faults and malfunctions may thus be compensated without problem.

In one embodiment, a first number of users to be synchronized is connected via a communications link, each user determining a view of the global time, with a second number of users to be synchronized determining the respective global time on the communications link, the second number being smaller than the first number. The bus load can be reduced significantly in this way, because each user to be synchronized need not apply its view of the global time to the bus, and an optimizable, preselectable number of users can be selected in this regard.

In another embodiment, a correction quantity may be determined from the shape of the first and/or at least one second local global time curve and the shape of the overall global time curve, and this correction quantity may be used to approximate or in particular to fit the shape of the first and/or at least one second local global time curve to the shape of the overall global time curve, with a maximum and/or minimum value being predefined for the correction quantity.

Another embodiment may provide for a different curve shape to be predefined instead of using the shape of the first and/or at least one second local global time curve and for a correction quantity to be determined from the differential shape and the shape of the overall global time curve and used to approximate the shape of the first and/or at least one second local global time curve to the shape of the overall global time curve.

DETAILED DESCRIPTION

Figure 1:
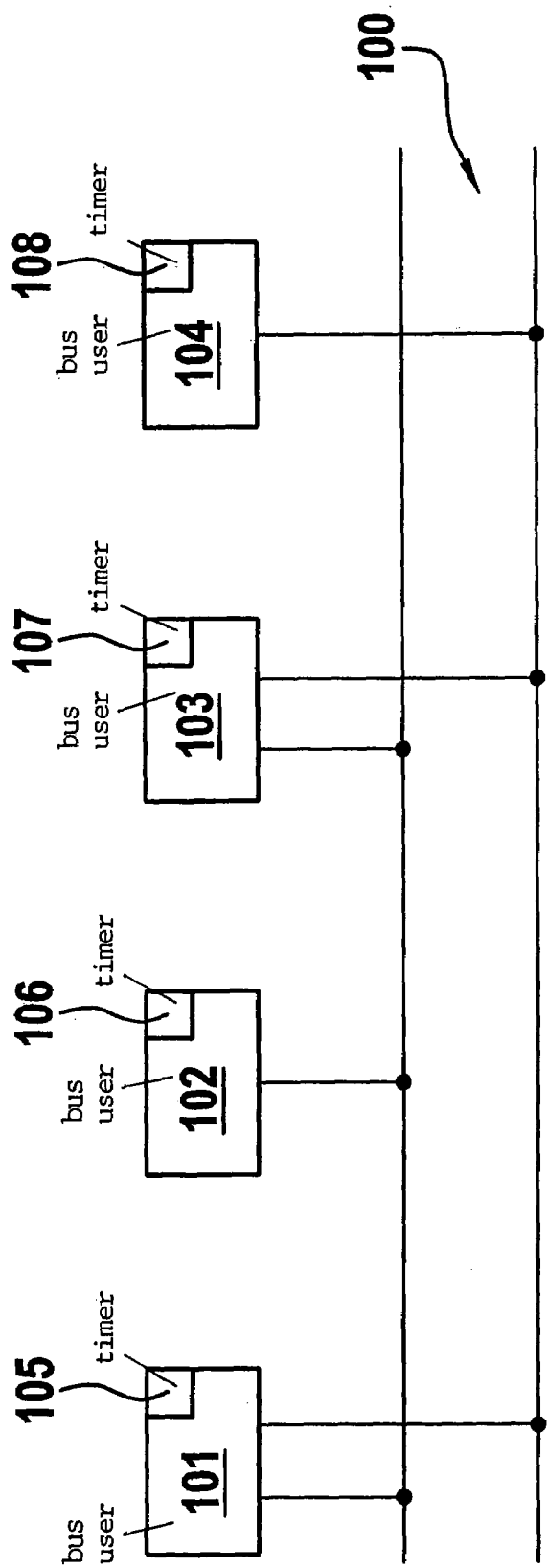
FIG. 1 is a schematic diagram of a bus system or a communications link having multiple users according to one embodiment of the present invention.

FIG. 1 shows a bus system 100 having multiple bus users 101–104 according to one embodiment of the present invention. Each user 101–104 has its own timer 105–108, represented by an internal arrangement such as a clock, a counter, a clock generator, etc. Each selected user may transmit an event on bus system 100 or the communications link, triggering each individual user to determine its own view of the global time Gi for this event, so each user has its own view of global time G of the system. In addition to one bus, i.e., a single communications link, multiple busses may also be used, e.g., two for redundancy purposes. Each user need not be connected to each bus as shown in FIG. 1. The global time can be determined for each bus, and an adjustment of users 101–103 connected to the two busses can be determined.

Figure 2:
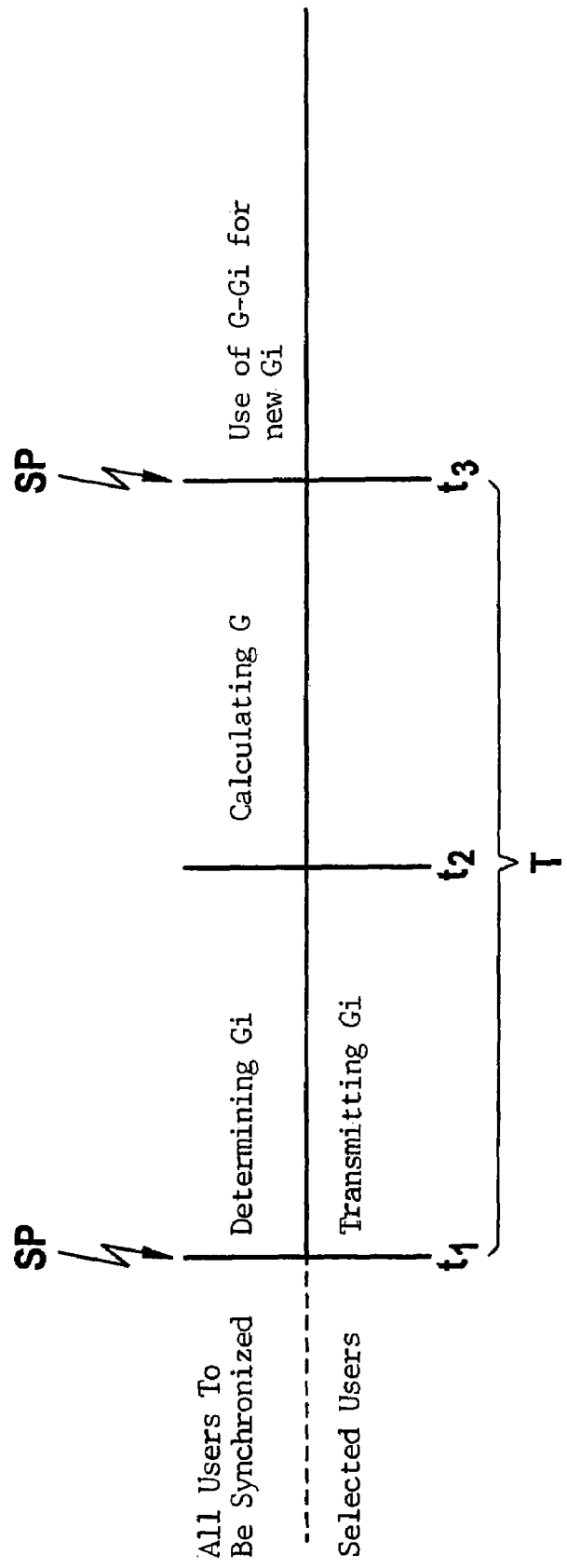
FIG. 2 illustrates the chronological sequence of the method according to one embodiment of the present invention.

FIG. 2 shows the basic sequence of the synchronization operation. First, an event is transferred on the communications link. For example, this event may be triggered by a user of the communications link. This event may be a synchronization pulse SP, for example, as illustrated in FIG. 2. It may be configured as a simple pulse or as the rising or trailing edge of a signal. For example, a signal provided explicitly for this purpose may be transmitted, or an edge of a preselectable or predefinable binary signal transmitted in a message over the communications system on the communications link may be used. Triggered by this event, certain users each may then send a view of the global time determined for this event on the communications link. At least two individual views of the global time Gi should be transmitted by the users on the communications system. However, not all users connected over the communications link, i.e., not all users to be synchronized need each transmit their own view of the global time on the bus system.

However, all users to be synchronized may detect all individual views of the global time Gi transmitted on the communications link in order to determine an overall global time G. The determination of an overall global time may be done by averaging, for example, with or without the deletion of extreme values prior to averaging. If all users to be synchronized use the same method of forming the respective overall global time, then it may be possible, within a minor tolerance, that the resulting overall global times of the individual users coincide at time t3. This overall global time thus determined, however, is then referred to time t1 of the event.

By a comparison (e.g., forming the difference, the quotient, etc.) of their own views of the global time Gi referred to t1 at time t3 with overall global time G thus determined, which is valid for time t1, a deviation of the view of the global time Gi of each user compared to the respective overall global time G can be determined. With the help of this deviation, a new individual view of the global time Gi, approximated, i.e., fitted, taking into account error effects, can be determined for a new event at time t3 with the help of a correction quantity determined from the deviation.

Determination of the individual views of the global time need not be triggered by a new event, but instead it may also be determined after a predefinable interval t or simply in sequence, for example. However, if events, specifically repeated events, are used as the triggering factor for a correction calculation, then the individual view of the global time in effect at a respective user is approximated to the overall global time of the communications link having all the users. Optimum synchronization having the advantages mentioned above can be achieved through this quasi "control method" of adaptation of individual views of the global time.

Figure 3:
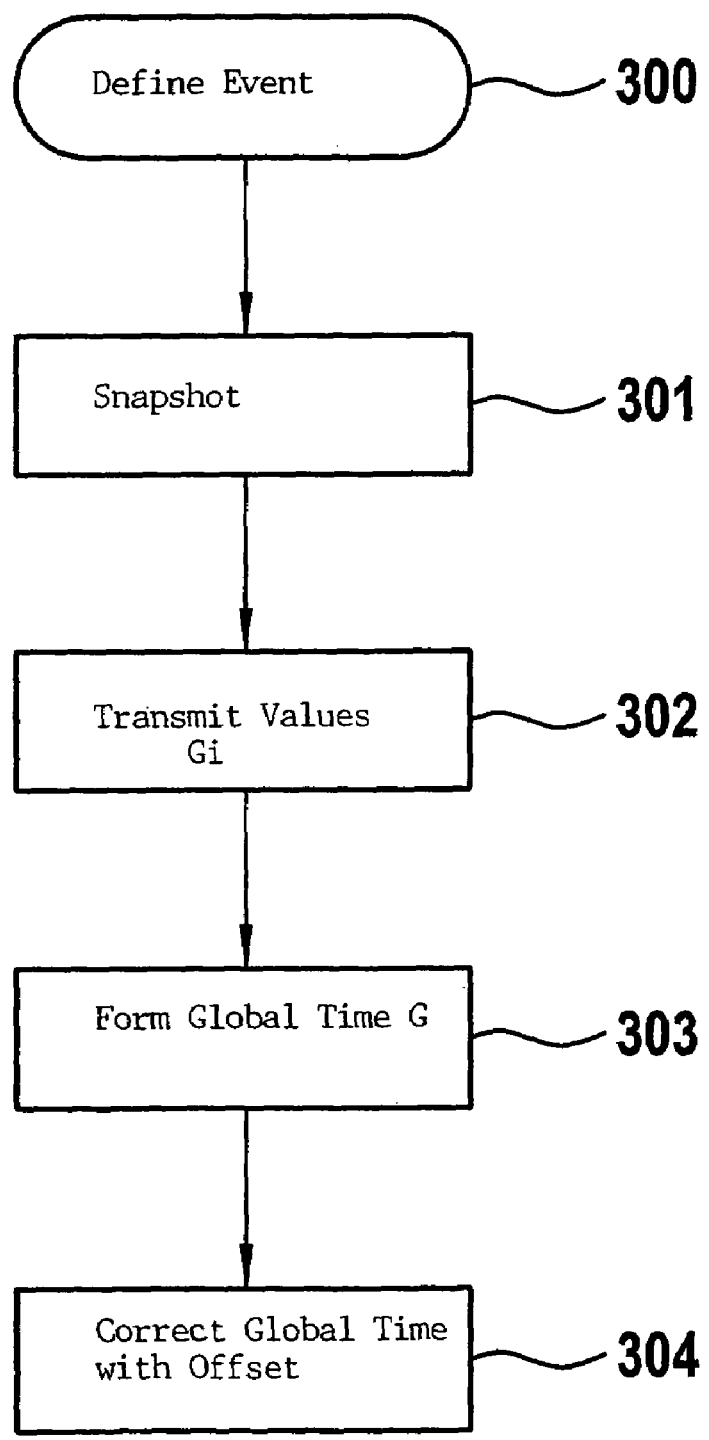
FIG. 3 is a flowchart illustrating the method and synchronization algorithm according to one embodiment of the present invention.

This is explained in greater detail below on the basis of the following flow chart in FIG. 3. The sequence of the synchronization algorithm, including the necessary prerequisites, is described below.

First, in block 300 an event apparent on the bus is defined. In one example embodiment of the present invention, such an event is necessary, and a clear definition of this event which can be checked by each user or controller is essential. For brevity, this event is referred to as SP, mentioned above.

It may be important for all controllers to detect this event simultaneously. The quality of this "simultaneity" has a direct effect on the quality of the resulting synchronization. Simultaneity can also be established mathematically by taking into account run times, conversion times or similar known influencing quantities.

Examples of such an event may include:
  a synchronization pulse established specifically for this purpose;
  a specific bit (or a specific part thereof) of a specific message; and
  a certain bit (or a specific part thereof) of the first (second, . . . ) message after a certain event.

Error tolerance may be incorporated into the system through the definition of the event.

According to one embodiment of the present invention, it may be important to ensure that the event occurs often enough, but it need not occur periodically.

Likewise, the event need not always occur at the same users. The frequency of occurrence will depend in particular on the specific application, and it can be selected freely or it can be obtained from the system. If the event fails to occur once (e.g., in the case of a periodic transmission), a later time may be used with without problem, e.g., a transmission in the next period influences the synchronization quality with a factor of 2 (e.g., from 200 ns to 400 ns).

Next there is a measurement mechanism in block 301.

In each controller to be synchronized, there must be a measuring mechanism which can define time SP in the local view of the global time. The quality (resolution) of the measurement accuracy is directly proportional to the synchronization quality that can be achieved.

Global time G is typically implemented locally by one or more counters plus optionally the respective offsets.

Thus, in block 301 a snapshot (e.g., capture compare) of the local view of the local time at the time of event SP is required. The value of the snapshot in each controller i is designated as $G_i$.

Values $G_i$ are transmitted in block 302. Values $G_i$ must be transmitted between two events. Although this uses up bandwidth, it may be optimized as explained above, because not all $G_i$ need to be sent, but only a sufficient quantity must be sent (a master synchronization is performed in the case of a single $G_i$).

It may be defined in advance (i.e., off-line) when all $G_i$'s that are to be taken into account have in fact been sent, i.e., when the detection of all $G_i$'s is ended, e.g., at t2.

Then the global time is formed in block 303, using an algorithm (e.g., one with error tolerance) to form global time G (at time SP) from $G_i$. All nodes, including those whose $G_i$ values do not contribute to the global time, may make this determination (at any time) between a last $G_i$ transmitted and a next SP.

Examples of such determinations include:
$G=(G_1+\ldots+G_n)/n$, where extreme values can be eliminated in advance, for example;
$G=FTA(G_1,\ldots,G_n)$ using any of the conventional error-tolerant algorithms;
G is the "average" of $G_i$.

It may be convenient to run the same algorithm in each controller, but it is not necessary.

Each node i may then determine the offset ($G-G_i$) of its own view of the global time at the actual global time (at time SP and up to the measurement inaccuracy mentioned above).

At a next SP in block 304, this offset is used to correct the global time, where the following hold:

Instant SP need not be selected directly; instead it is sufficient if an individual view of the global time is corrected so that there are no consistency problems.

"Retroactively" to the last SP, this ensures that the individual view of the global time and the actual global time are the same (at least at the time of the last SP).

In the steady state, the offset can be shifted only by the drift of the individual time between two SPs. In other words, if $v_{1g}$ is the rate of the local view of the global time, and $v_g$ is the rate of the global time, then $(v_g-v_{1g})AT$ is the value of the offset when T is the interval between two SPs in question.

The difference $(v_g-v_{1g})$ depends on the quality of the oscillators used for local generation of global time.

Figure 4A:
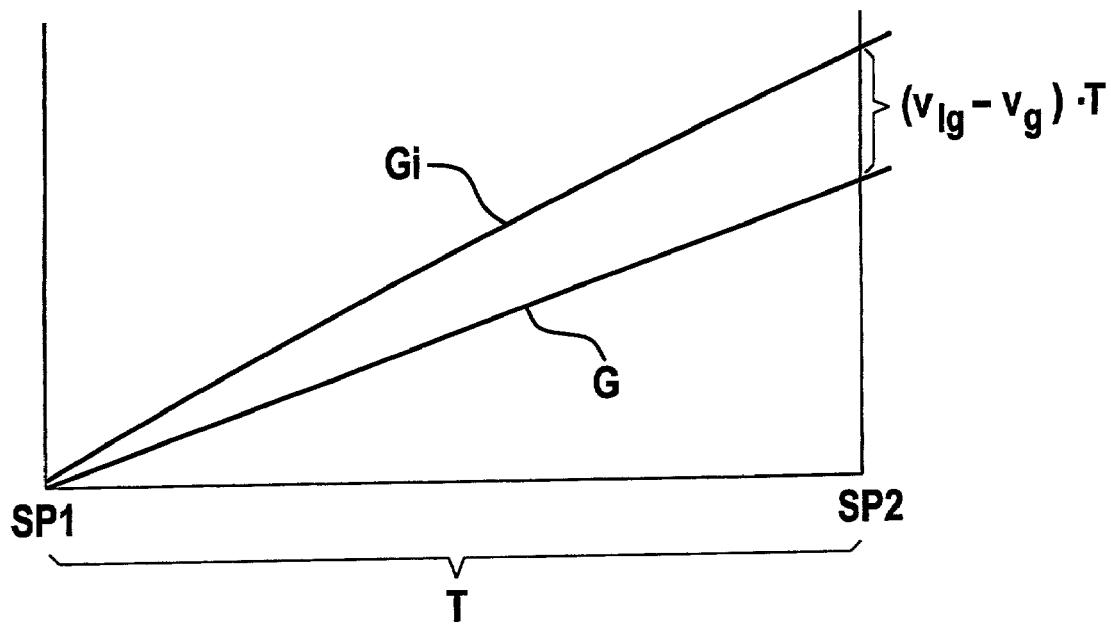
FIGS. 4a and 4b illustrate the correction of the global time of a user based on the overall global time according to one embodiment of the present invention.
Figure 4B:
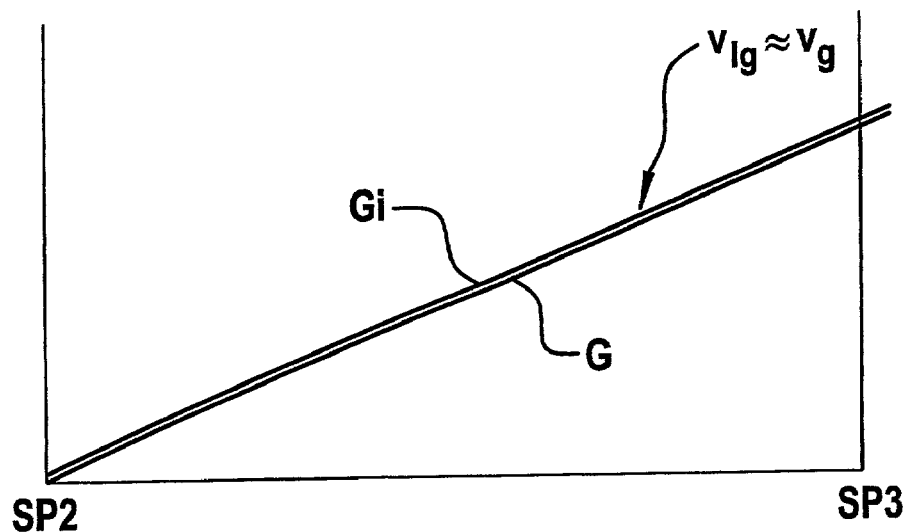

Another embodiment may derive from the fact that this method can also be used to make the difference $(v_g-v_{1g})$ itself small, i.e., to perform fitting of the shape of the global time curve and dedicated local times Gi, as illustrated in FIGS. 4a and 4b and as described below. The assumption for this embodiment is that $v_g$ can be influenced. There are several different possibilities for this (e.g., oscillators in which frequency is influenced by voltage, hardware which can add or omit a pulse of the oscillator, non-integer conversion of a clock tick into counter values, etc.).

In addition, according to the preceding discussion, measurement of the offset is essentially a measurement of difference $v_g-v_{1g}$, so the new value of $v_{1g}$ can be generated directly by using this difference. In other words, difference ($G_i-G$) may subsequently be distributed uniformly over an interval of length T.

Another effect is cluster drift; this means that due to the control of the global time using the global time thus determined, cluster drift may occur in the form of a propagation of tolerance, a quasi rise in the shape, i.e., a drift of the total time of all users to be synchronized. However, with the method according to one embodiment the present invention, it may be possible to prevent the entire cluster from drifting as a whole (although well synchronized to one another). This occurs, for example, by defining a maximum/minimum value for correction of $v_{1g}$ or by systematically influencing the correction of $v_{1g}$ in the direction of the configuration values. In other words, instead of a theoretically ideal $v_{1g}$ value, a value slightly closer to the configuration value is used. The details will always depend on the method by which $v_{1g}$ is influenced (see above). The effect here is that the quality of the synchronization is slightly worsened, but then the overall drift of the cluster is prevented.

FIGS. 4a and 4b illustrate an example of a correction calculation for a user. FIG. 4a shows the shape of the local global time ($G_i$) curve of the respective user, which reflects the temperature, aging phenomena, etc. with respect to the overall global time (G) determined in general. According to the example, the internal timer of the user runs faster than a timer which would correspond to the overall global time. This is manifested in the shapes of curves LGT and GT and in their slope in particular. In the case of the first event, the respective global times, in particular those of this user, are relayed over the communications system. In the case of a repeated event in SP2, for example, there is then a deviation $(V_{1g}-V_g)AT$ between the internal timer of the user and the overall global time. A correction quantity is then determined from this deviation, and thus the shape of the internal timer curve of the user is corrected. In this way, for example, the deviation itself $(V_{1g}-V_g)AT$ is distributed over time window T. Therefore, until a third event SP3, the internal timer will run in approximation to the overall global time.

What is claimed is:

1. A method for synchronizing at least two users, each of the users to be synchronized having a respective individual timer, the users being connected by at least one communications link, at least one event being transmitted for synchronization over the communications link, the method comprising the steps of:

determining, by a first user, a first view of a global time as a function of the at least one event;

determining, by a second user, a second view of the global time as function of the at least one event;

transmitting, by the first user and the second user, the first view of the global time and the second view of the global time over the communications link;

determining, by each of the first user and the second user, an overall global time using a mixture of the first view of the global time and the second view of the global time;

synchronizing, by each of the first user and the second user, the respective individual timer using the determined overall global time;

predefining a shape;

determining a correction quantity using the predefined shape and a shape of an overall global time curve; and approximating a new shape of at least one of a first global time curve and a second global time curve using the correction quantity.

2. The method according to claim 1, wherein each of the first user and the second user determine the overall global time in the same manner.

3. The method according to claim 1, wherein the at least one event is transmitted repeatedly over the communications link.

4. The method according to claim 1, wherein the synchronizing step further comprises:

approximating shapes of at least one of the first global time curve and the second global time curve between two events with the shape of the overall global time curve determined by at least one of the first user and the second user, wherein the approximated shapes of the curves are used in synchronizing each respective individual timer.

5. A method for synchronizing users, each user to be synchronized having a respective individual timer, the method comprising the steps of:
connecting a first number of users to be synchronized by a communications link;
transmitting on the communications link at least one event for synchronization;
determining, by each of the first number of users, a respective view of a global time as a function of the at least one event;
transmitting on the communications link by each of a second number of the users to be synchronized the respective view of the global time, the second number being smaller than the first number;
determining by the users to be synchronized, an overall global time using a mixture of the transmitted respective views of the global time;
synchronizing, by each of the users to be synchronized, the respective individual timer using the determined overall global times predefining a shape;
determining a correction quantity using the predefined shape and a shape of an overall global time curve; and
approximating a new shape of at least one of a first global time curve and a second global time curve using the correction quantity.

6. The method according to claim 5, further comprising:
determining the correction quantity from shapes of at least one of the first global time curve and the second global time curve; and
approximating the shape of at least one of the first global time curve and the second global time curve using the shape of the overall global time curve and the correction quantity by fitting, at least one of a maximum value and a minimum value being predefined for the correction quantity.

7. A method for synchronizing at least two users, each of the users to be synchronized having a respective individual timer, the users being connected by at least one communications link, at least one event being transmitted for synchronization over the communications link, the method comprising the steps of:
determining, by a first user, a first global time as a function of the at least one event;
determining, by a second user, a second global time as function of the at least one event;
transmitting, by the first user and the second user, the first global time and the second global time over the communications link;
determining, by each of the first user and the second user, an overall global time using the first global time and the second global time;
synchronizing, by each of the first user and the second user, the respective individual timer using the determined overall global time;
predefining a shape;
determining a correction quantity using the redefined shape and a shape of an overall global time curve; and
approximating a new shape of at least one of a first global time curve and a second global time curve using the correction quantity.

8. A system for synchronizing at least two users, each user to be synchronized having a respective timer, the at least two users being connected by at least one communications link, an event for synchronization being transmitted on the communications link, the system comprising:
a first arrangement at the first user determining a first view of a global time as a function of the event;
a second arrangement at the second user determining a second view of the global time as a function of the event;
a respective transmitter at each of the first user and the second user transmitting the first view of the global time and the second view of the global time;
a determination arrangement at each of the first user and the second user determining an overall global time from a mixture of the first view of the global time and the second view of the global time; and
a synchronizer at each of the first user and the second user synchronizing the respective timer using the overall global time,
wherein the determination arrangement is configured to determine a correction quantity using a predefined shape and a shape of an overall global time curve, and to approximate a new shape of at least one of a first global time curve and a second global time curve using the correction quantity.

9. The method according to claim 7, wherein the overall global time is determined from a mixture of the first global time and the second global time.

10. The method according to claim 7, wherein each of the first user and the second user determine the overall global time in the same manner.

11. The method according to claim 7, wherein the at least one event is transmitted repeatedly over the communications link.

12. The method according to claim 7, wherein the synchronizing step further comprises:
approximating shapes of at least one of the first global time curve and the second global time curve between two events with the shape of the overall global time curve determined by at least one of the first user and the second user, wherein the approximated shapes of the curves are used in synchronizing each respective individual timer.

13. The method according to claim 7, further comprising:
determining the correction quantity from shapes of at least one of the first global time curve and the second global time curve; and
approximating the shape of at least one of the first global time curve and the second global time curve using the shape of the overall global time curve and the correction quantity by fitting, at least one of a maximum value and a minimum value being predefined for the correction quantity.

14. The system according to claim 8, wherein the determination arrangement at each of the first user and the second user determines the overall global time in the same manner.

15. The system according to claim 8, wherein the event is transmitted repeatedly over the communications link.

16. The system according to claim 8, wherein the determination arrangement is configured to approximate shapes of at least one of the first global time curve and the second global time curve between two events with the shape of the overall global time curve determined by at least one of the first user and the second user, wherein the approximated shapes of the curves are used in synchronizing each respective individual timer.

17. The system according to claim 8, wherein the determination arrangement is configured to determine the correction quantity from shapes of at least one of the first global time curve and the second global time curve, and to approximate the shape of at least one of the first global time curve and the second global time curve using the shape of the overall global time curve and the correction quantity by fitting, at least one of a maximum value and a minimum value being predefined for the correction quantity.

* * * * *